United States Patent [19]

Maxson

[11] 4,336,364

[45] Jun. 22, 1982

[54] METHOD OF PRODUCING ORGANOSILICON COMPOSITION WITH IN SITU PRODUCED CURE INHIBITOR

[75] Inventor: Myron T. Maxson, Midland, Mich.

[73] Assignee: Dow Corning Corporation, Midland, Mich.

[21] Appl. No.: 284,769

[22] Filed: Jul. 20, 1981

[51] Int. Cl.$^3$ ............................................. C08G 77/06
[52] U.S. Cl. .................................... 528/15; 525/478; 528/31; 528/29; 528/32
[58] Field of Search ...................... 528/15, 31, 32, 29; 260/37 SB; 525/478

[56] References Cited

U.S. PATENT DOCUMENTS 3,933,880 1/1976 Bergstrom et al. ........... 260/448.2 E
3,989,666 11/1976 Niemi ........................... 260/46.5 UA
3,989,667 11/1976 Lee et al. ...................... 260/465 UA Primary Examiner—Melvyn I. Marquis
Attorney, Agent, or Firm—Roger H. Borrousch

[57] ABSTRACT

A storage stable, one part, heat curable organosilicon composition is prepared by mixing an organosilicon polymer having at least two monovalent hydrocarbon radicals containing aliphatic unsaturation, a platinum catalyst, an acetylenic alcohol, and a siloxane compound having at least three silicon-bonded hydrogen atoms bonded to at least three separate silicon atoms; heating above 100° C.; cooling below 50° C.; removing excess acetylenic alcohol; and adding an organosilicon compound containing silicon-bonded hydrogen atoms to yield the organosilicon composition. The method produces an inhibitor for the curing reaction during the process of manufacture so that the composition is storage stable even though all the ingredients necessary for cure are present in the composition.

16 Claims, No Drawings

METHOD OF PRODUCING ORGANOSILICON COMPOSITION WITH IN SITU PRODUCED CURE INHIBITOR

BACKGROUND OF THE INVENTION

1. Field of the Invention

This invention relates to a method of producing a storage stable, one part, heat curable organosilicon composition through the in situ production of a cure inhibitor.

2. Description of the Prior Art

In U.S. Pat. No. 3,989,667, issued Nov. 2, 1976, by Lee et al., a polyorganosiloxane is described which is a platinum catalyst inhibitor at room temperature but not at elevated temperature. Also described is a curable organosilicon composition having the polyorganosiloxane as one of the ingredients.

Several methods for making the polyorganosiloxane of Lee et al. are described in the patent. The best method is stated to be that taught in U.S. Pat. No. 3,933,880, issued Jan. 20, 1976, by Bergstrom, Lee, and Maxson. The polyorganosiloxane is prepared by continuously passing a mixture of an acetylenic alcohol, a platinum catalyst, and a siloxane compound having at least three silicon-bonded-hydrogen atoms through a heating means wherein the mixture is heated above 100° C. and above the temperature at which the reaction product no longer inhibits the reaction, which is under sufficient pressure to maintain the reaction mixture in the liquid state, and recovering the polyorganosiloxane.

The method of the Bergstrom et al. patent requires specialized equipment capable of operation at elevated temperatures and pressures. The method also requires distillation under reduced pressure to remove unreacted material.

U.S. Pat. No. 3,989,666, issued Nov. 2, 1976, to Niemi discloses a method of preparing a crosslinker-platinum catalyst-inhibitor composition comprising mixing a siloxane having an average of at least three silicon-bonded hydrogen atoms per molecule, an acetylenic alcohol, and a platinum catalyst to form a mixture, heating the mixture in a closed system for 10 to 30 hours at a temperature of from 50° C. to 90° C., and thereafter removing unreacted acetylenic alcohol by applying a reduced pressure of 700 to 750 mm of mercury for at least 10 hours at a temperature of from 20° C. to 30° C. The patent further discloses a curable composition comprising an organosilicon polymer having an average per molecule of at least two monovalent hydrocarbon radicals containing aliphatic unsaturation, and the crosslinker-platinum catalyst-inhibitor composition prepared by the above method.

The method of Niemi manufactures a crosslinker-platinum catalyst-inhibitor composition which is subsequently used as an ingredient in a curable composition. The composition of the curable composition is restricted in that the ratio of platinum catalyst, acetylenic alcohol, and siloxane having at least three silicon-bonded hydrogen atoms per molecule is predetermined at the time of manufacture of the crosslinker-platinum catalyst-inhibitor composition. No method of adjusting the ratio of aliphatic unsaturation on the organosilicon polymer to reactive groups in the crosslinker-platinum catalyst-inhibitor composition is provided for that does not also upset the property of inhibition and causes one to lose the advantages gained from the Niemi composition.

SUMMARY OF THE INVENTION

The method of this invention produces an organosilicon composition that is storage stable at room temperature, curable at elevated temperature, and contains a cure inhibitor that is produced during the manufacture of the organosilicon composition.

The steps of the method include mixing an aliphatically unsaturated organosilicon polymer, a platinum catalyst, an acetylenic alcohol, and a siloxane compound having at least three silicon-bonded hydrogen atoms bonded to at least three separate silicon atoms at a temperature which is above the temperature at which the olefinic siloxane compound formed by the reaction of the acetylenic alcohol and the siloxane compound is no longer an inhibitor for the reaction. After cooling to below 50° C. and removing excess acetylenic alcohol, the addition of an organosilicon compound containing silicon-bonded hydrogen atoms, as a crosslinking agent, yields a storage stable organosilicon composition.

It is an object of this invention to produce a storage stable, one part, heat curable organosilicon composition that does not require the further addition of a platinum catalyst inhibitor to inhibit the addition of SiH to aliphatic unsaturation at room temperature.

Another object of this invention is to eliminate the necessity of separately manufacturing an olefinic siloxane compound for use as an inhibitor for platinum catalysts.

It is an object of this invention to produce an organosilicon composition that is storage stable, one part, and heat curable, containing an olefinic siloxane compound for use as an inhibitor for platinum catalysts, in an economical method.

It is an object of this invention to produce an organosilicon composition, containing an olefinic siloxane compound for use as an inhibitor for platinum catalysts, the ratio of ingredients being controllable in a manner so that the cured properties can be varied.

DESCRIPTION OF THE INVENTION

This invention relates to a method of preparing a storage stable, one part, heat curable organosilicon composition consisting essentially of (A) mixing (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of said organosilicon polymer being satisfied by divalent radicals selected from the group consisting of divalent oxygen atoms, divalent hydrocarbon radicals, divalent hydrocarbon ether radicls, and divalent haloarylene radicals, said divalent radicals linking silicon atoms; (2) a platinum catalyst in an amount of at least 0.1 part by weight of platinum per one million parts by weight of the combined weights of organosilicon polymer (1) and organosilicon compound (5); (3) an acetylenic alcohol, liquid at the reaction conditions of step (B) and distillable at temperatures of less than 120° C. at a pressure of 133 pascals, in an amount sufficient to provide at least one mole of acetylenic radical for each 3 moles of silicon-bonded hydrogen atoms in siloxane compound (4); (4) a siloxane compound having at least 3 silicon-bonded hydrogen atoms with no more than one silicon-bonded hydrogen atom per silicon atom, the organic groups on the silicon atoms being monovalent hydrocarbon radicals having no aliphatic unsaturation, the siloxane compound being a linear, branched, or cyclic molecule containing from 3 to 100 siloxane units, then; (B) heating to a temperature which is between 100° and 150° C. and which is also above the temperature at which an olefinic siloxane compound formed by the reaction of the acetylenic alcohol (3) and the siloxane compound (4) is no longer an inhibitor for the reaction, in a closed container for a time sufficient to allow the reaction to produce the olefinic siloxane compound; (C) cooling to below 50° C.; (D) reducing pressure over the reaction mixture to an amount sufficient to remove any unreacted acetylenic alcohol (3), then; (E) admixing (5) an organosilicon compound containing silicon-bonded hydrogen atoms, there being in addition an average of up to 2 monovalent organic radicals per silicon atom selected from the group consisting of monovalent hydrocarbon radicals free of aliphatic unsaturation, monovalent halohydrogen radicals free of aliphatic unsaturation, and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals, and divalent haloarylene radicals, said divalent radicals linking silicon atoms, there being an average of at least two silicon-bonded hydrogen atoms per molecule of organosilicon compound (5), the sum of the average number of aliphatic unsaturated monovalent radicals per molecule of organosilicon polymer (1) and the average number of silicon-bonded hydrogen atoms per molecule of organosilicon compound (5) being at least 4, the organosilicon composition further restricted in that the amount of organosilicon polymer (1) is sufficient to control the reaction exotherm.

The method of this invention is useful in producing organosilicon compositions that cure through the addition reaction of silicon-bonded hydrogen atoms with aliphatic unsaturation. The reaction is known to be catalyzed with platinum catalysts that are effective at room temperature. Thus, when a vinyl-containing siloxane polymer is mixed with an organosilicon compound containing silicon-bonded hydrogen atoms in the presence of platinum catalysts a reaction occurs and, if the ratio of vinyl radical to silicon-bonded hydrogen is proper, the composition cures at room temperature to a coherent solid, such as an elastomer or resin. This room temperature reactivity has forced manufacturers to provide products stored in two or more packages to prevent premature curing. However, there are some known materials which will inhibit the activity of platinum catalysts at room temperature, but not at elevated temperatures and thus allow products to be stored in one package. However, incompatibility in siloxane mixtures, wrinkling of the surface on cure, volatility of some of these inhibitors, such as certain acetylenic compounds, gradual deactivating of the platinum catalyst on storage, and slower high temperature cure, promoted the search for more desirable platinum catalyst inhibitors.

The polyorganosiloxanes described in U.S. Pat. No. 3,989,667, issued Nov. 2, 1976, to Lee et al. provide one solution to these problems. Several methods of preparing the polyorganosiloxanes of U.S. Pat. No. 3,989,667 were developed as described in U.S. Pat. No. 3,933,880, issued Jan. 20, 1976; U.S. Pat. No. 3,933,882, issued January 20, 1976; and U.S. Pat. No. 3,971,818, issued July 27, 1976. Each of these methods produced polyorganosiloxanes which could be used to inhibit the platinum catalyzed reaction of silicon-bonded hydrogen atoms with aliphatic unsaturation. All of these methods required a separate manufacture of the polyorganosiloxane. The method of this invention eliminates the necessity and expense of producing a distinct polyorganosiloxane inhibitor because it produces an inhibitor in situ during the manufacture of an organosilicon composition which is a one part composition which is storage stable at room temperature, but cures when exposed to elevated temperatures.

It has unexpectedly been found that when an organosilicon polymer containing aliphatic unsaturation is mixed with a platinum catalyst, an acetylenic alcohol, and a siloxane compound having at least three silicon-bonded hydrogen atoms bonded to at least three separate silicon atoms and heated to an elevated temperature, the reaction between the acetylenic alcohol and the siloxane compound takes place to produce an olefinic siloxane compound which acts as a platinum catalyst inhibitor without destroying the ability of the aliphatic unsaturation on the organosilicon polymer to react with an organosilicon compound containing SiH when it is added to the mixture at a later step in the process.

This invention is unexpected due to the nature of the reactions thought to occur during the method of this invention. Two competing reactions are thought to occur:

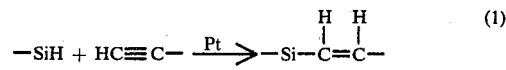

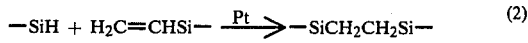

Independently, reaction (1) is a relatively slow reaction, while reaction (2) is very rapid. If the two reactions are combined, the acetylenic material of reaction (1) can inhibit the reaction of (2) as long as the acetylenic material is not totally consumed by reaction (1). However, the products of reaction (1) are strong inhibitors for both reaction (1) and reaction (2) at room temperature. The mixture of organosilicon polymer containing aliphatic unsaturation, acetylenic alcohol, siloxane compound having at least three silicon-bonded hydrogen atoms, and platinum catalyst can be heated to a temperature so that it is above the temperature at which the product of reaction (1) inhibits the platinum catalyst, but below the temperature at which the acetylenic alcohol inhibits the reaction (2). This upper temperature is about 150° C. This unexpected result can be usefully employed in the manufacture of one part, storage stable, heat curable organosilicon compositions.

The method of this invention is easily combined with the normal process of production of platinum catalyzed one part compositions. A commercial dough mixer can be loaded with an organosilicon polymer, a filler if desired, a platinum catalyst, an acetylenic alcohol, and a siloxane compound having at least three silicon-bonded hydrogen atoms and no more than one silicon-bonded hydrogen atom per silicon atom.

The mixer is capable of being vapor sealed to contain the ingredients during the steps of the method. The mixer should have a pressure relief valve for safety reasons.

After mixing the contents, the mixer is heated to raise the temperature of the contents to a temperature high enough to allow the reaction between the acetylenic alcohol and the siloxane compound to proceed. This is above a temperature of about 100° C. The unreacted acetylenic alcohol inhibits the reaction of the organosilicon polymer and the siloxane compound unless the temperature is above 150° C. The preferred temperature depends upon the exact reactants used and is easily determined by experiment. The ingredients are combined in a small vial and heated to the test temperature for the desired process time, for instance 1 hour. The amount of $H_2C=CHSi-$ present is analyzed. A plot can be constructed which shows the temperature at which the $H_2C=CHSi-$ begins to disappear at an appreciable rate, thus showing that the reaction temperature is too high. A loss of greater than about 20% $H_2C=CHSi$ in the desired process time would indicate the upper temperature limit.

After the siloxane compound has been reacted with the acetylenic alcohol, the temperature of the mixer contents is lowered to a temperature below 50° C. which is within the inhibiting range of the newly formed inhibitor. Excess or unreacted acetylenic alcohol can be stripped from the reaction mixture by reducing the pressure in the mixer. The resulting product is a mixture containing organosilicon polymer, still having aliphatic unsaturation; filler if used; platinum catalyst; and an olefinic siloxane compound which is a platinum catalyst inhibitor. An organosilicon compound containing silicon-bonded hydrogen atoms can then be added as a crosslinker to yield a one part, storage stable organosilicon compound that will cure on exposure to elevated temperatures.

The method can be varied as long as the essential elements remain. A filler can be added during the first step, or can be added during a later step. The removal of excess or unreacted acetylenic alcohol by reducing the pressure in the mixer can take place after the mixture has been cooled to less than 50° C. or it can be removed at a higher temperature before cooling to less than 50° C. in step (C). A satisfactory dispersion of filler in the composition is more easily obtained if the filler and part of the organosilicon polymer is used during step (A) and the remainder of the organosilicon polymer is added at a later point in the method. Enough polymer must be used in step (A) of the method to act as a heat sink to control the exothermic reaction of the platinum catalyzed reaction of the acetylenic alcohol (3) with the siloxane compound (4) having at least three silicon-bonded hydrogen atoms per molecule when it is heated to an elevated temperature. The reaction as described by Niemi in U.S. Pat. No. 3,989,666 could take place with explosive violence.

It is within the method of this invention to produce a storage stable, one part, heat curable organosilicon composition by producing a first composition containing an in situ produced inhibitor, following the method described above, then mixing it with a second composition not containing the in situ produced inhibitor. The second composition would be produced by mixing the same ingredients as used in the first composition, but not adding the acetylenic alcohol (3) or the siloxane compound (4) used in the first mixture to yield the in situ produced inhibitor. The concentration of in situ produced inhibitor would, of course, be less in the combined mixture of the first mixture and the second mixture. The combined mixture is then mixed with an organosilicone compound (5) as a crosslinking agent to give the storage stable, one part, heat curable organosilicon composition.

Organosilicon polymer (1) can be a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, butadienyl, cyclopentenyl, m-vinyl-phenyl and the like.

Any monovalent halohydrocarbon radical and cyanoalkyl radical can be used in (1), and include, for example, chloromethyl, 3,3,3-trifluoropropyl, 2,3-dibromocyclopentyl, iodophenyl, dichloronaphthyl, 2-cyanoethyl, 2-cyanopropyl, and omega-cyanooctadecyl.

In polymer (1), there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. The remaining valences of the silicon atoms in organosilicon polymer (1) are satisfied by divalent oxygen, divalent hydrocarbon radicals, divalent hydrocarbon ether radicals and divalent haloarylene radicals. Any one or more of the said divalent linkages can be present in polymer (1).

Examples of divalent radicals that can be used in polymer (1) include, for example, hydrocarbon radicals such as $-CH_2-$, $-CH_2CH_2-$, $-(CH_2)_{18}-$, $$-CH_2\overset{CH_3}{\underset{}{C}H}-, -CH_2\overset{CH_3}{\underset{CH_3}{C}}-, -CH_2CH=CHCH_2-,$$

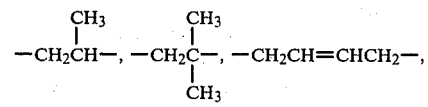

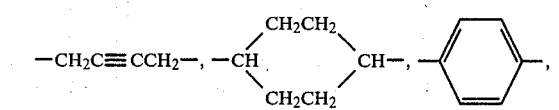

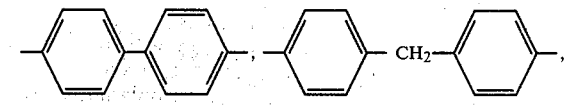

-continued

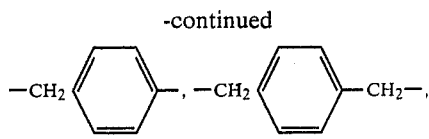

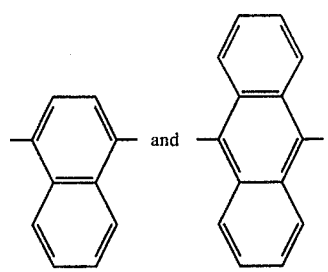

hydrocarbon ether radicals such as —CH₂CH₂OCH₂CH₂—, —CH₂CH₂CH₂OCH₂CH₂— and

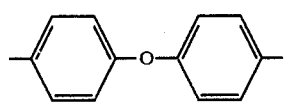

and haloarylene radicals such as

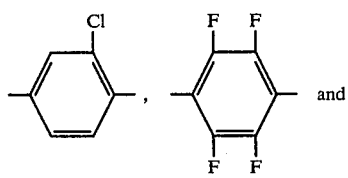

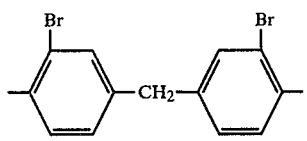

Any of the divalent linkages stated above can be present in polymer (1). However, where the average number of silicon atoms per molecule is greater than three, it is preferred when use of the finished product will include either both extremely high and extremely low temperature exposure, that at least 50 percent of the divalent linkages be oxygen. Organosilicon polymer (1) can be a copolymer, mixture of copolymers, mixture of monomers and polymers, mixtures of monomers and copolymers and the like.

Preparation of materials that can be polymer (1) are well known in the art. The monovalent radicals can be attached, for instance, by either the so-called "direct process," or via Grignard reaction, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy), as is well known in the art. Divalent organic radicals can be introduced via Wurtz-type synthesis, Grignard, direct process, etc. The preparations of compounds suitable for use as polymer (1) are well known in the art and need not be recited herein.

Platinum catalyst (2) can be any of the known forms, ranging from platinum as such or as deposited on carriers such as silica gel or powdered charcoal, to platinic chloride, salts of platinum and chloroplatinic acid and reaction products of chloroplatinic acid and an organosilicon compound such as those described by Willing in U.S. Pat. No. 3,419,593, issued Dec. 31, 1968, said patent hereby being incorporated by reference to show such catalysts and their method of manufacture.

Any of these forms will function in the instant curing system. A preferred form of platinum is the chloroplatinic acid either as the commonly obtainable hexahydrate or the anhydrous form, on account of its easy dispersability in organosilicon systems. Additional platinum compounds include, PtCl₂[P(CH₂CH₂CH₃)₃]₂ platinum bromides, a complex of platinous halide and an olefin such as ethylene, propylene, butylene, cyclohexane and styrene, Pt(CH₃CN)₂Cl₂, [Pt(CH₃CN)₂(CH₃)₄]Cl₂,
Pt(NH₃)₂Cl₂, K[PtCl₃CH₂CH₂CH₂OH],
PtBr₂(C₂H₄)₂,
K[PtBr₃(C₂H₄)], PtCl₂(C₂H₄), (CH₃)₂C=CH₂PtCl₂,
H₂Pt(CN)₄ . 5H₂O, H[PtCl₃(CH₃CN)],
Pt(NH₃)₂(CNS)₂,
PtCl₂PCl₃, [Pt(NH₃)₄ . PtCl₄],
PtCl₂[P(CH₂CH₃)₃]₂, PtCl₂ . P(OH)₃,
PtCl₂ . P(OCH₂CH₃)₃, PtCl₂ . [P(OCH₂CH₃)₃]₂,
Pt(OOCH₂SCH₂CH₃)₂, Pt(CN)₃, (CH₃)₄Pt,
(CH₃)₃Pt—Pt(CH₃)₃,

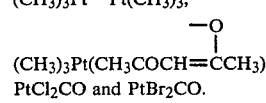

(CH₃)₃Pt(CH₃COCH=CCH₃)
PtCl₂CO and PtBr₂CO.

There should be at least 0.1 part by weight platinum per million parts by weight of the combined total weight of (1) and (5). However, since impurities in the system may easily poison this small quantity of catalyst, it is preferred to employ from 1 to 20 parts per million of platinum. A greater amount of the platinum can be used, but does affect the requirement of component (4) below, and economic considerations suggest the lower amounts mentioned.

The acetylenic alcohol (3) can be any of those alcohols having a C≡C bond which when reacted with a siloxane compound having SiH results in an olefinic containing siloxane which is an inhibitor for platinum catalyst at room temperature but not at elevated temperatures above 100° C.

Examples of such acetylenic alcohols include:
3-methyl-1-butyn-3-ol, 1-ethynylcyclohexan-1-ol, 3,5-dimethyl-1-hexyn-3-ol, 3-methyl-1-pentyn-3-ol and the like.

The siloxane compounds (4) are those having at least three silicon-bonded hydrogen atoms with no more than one silicon-bonded hydrogen atom per silicon atom. These siloxane compounds can be straight chain, cyclic, or branched. These siloxanes can be copolymers, homopolymers, single species, and mixtures of the various types mentioned above. It is preferred that these siloxane compounds have at least two of the silicon-bonded hydrogen atoms bonded to two silicon atoms separated by one oxygen atom, preferably three silicon-bonded hydrogen atoms bonded to three silicon atoms which are only separated by oxygen. Some of the siloxane compounds for use in the present method are defined by the following generic formulae, R₃SiO(RHSiO)ₓSiR₃, HR₂SiO(RHSiO)ᵤSiR₂H, -continued
(RHSiO)$_y$,
HR$_2$SiO(RHSiO)$_u$(R$_2$SiO)$_z$SiR$_2$H,
R$_3$SiO(R$_2$SiO)$_z$(RHSiO)xSiR$_3$, HR$_2$SiO(RHSiO)$_y$—SiR$_3$,
HR$_2$SiO(R$_2$SiO)$_z$(RHSiO)$_v$SiR$_3$.

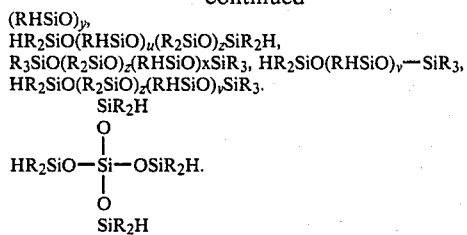

and the like, wherein each R is a monovalent hydrocarbon radical having no aliphatic unsaturation such as methyl, ethyl, phenyl, propyl, hexyl, cyclohexyl, octyl, dodecyl, cyclopentyl, isopropyl, or fluorinated monovalent hydrocarbon radicals such as 3,3,3-trifluoropropyl, other perfluoroalkylethyl radicals, α,α,α-trifluoromethylphenyl, hexafluorophenyl and the like.

The number of siloxane units per molecule (x, u, v, y, and z) can vary from as little as 3 to as many as 100, preferably from 3 to 50 siloxane units per molecule. Other siloxane compounds are also suitable such as those which have arylene or alkylene bonds between some of the silicon atoms. Some specific siloxane compounds include (CH$_3$)$_3$SiO[(CH$_3$)HSiO]$_3$Si(CH$_3$)$_3$, (CH$_3$SiO)$_3$
|
H

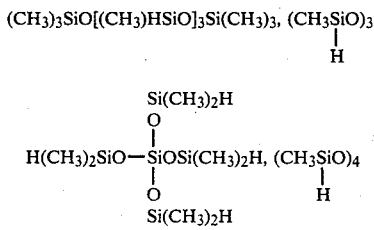

and the like.

Organosilicon compound (5) can be any organosilicon compound having silicon-bonded hydrogen atoms. It can contain two or more silicon-bonded hydrogen atoms per molecule and in addition an average of up to two monovalent radicals per silicon atom, as set forth above. These can include, for example, alkyl radicals such as methyl, ethyl, isopropyl, tert-amyl, octadecyl, and myricyl; cycloalkyl radicals such as cyclopentyl and cyclohexyl; aralkyl radicals such as benzyl, β-phenylethyl, and xylyl; and aryl radicals such as phenyl, tolyl, xenyl, napthyl and anthracyl. In addition, monovalent halohydrocarbon radicals such as chloromethyl, 3,3,3-trifluoropropyl, α,α,α-trifluorotolyl, bromophenyl and 2,3-dibromocyclopentyl can be present in component (5). Also, cyanoalkyl radicals such as cyanoethyl and cyanobutyl can also be present. The organic radicals can be alike or different.

The remaining valences of the silicon atoms of organosilicon compound (5) are satisfied from divalent oxygen, divalent hydrocarbon radicals free of aliphatic unsaturation (e.g.
—CH$_2$—, —(CH$_2$)$_{18}$—, —CH$_2$CH(CH$_3$)—, —CH$_2$C(CH$_3$)$_2$—,

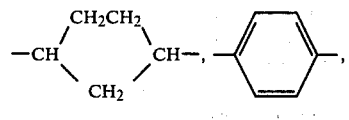

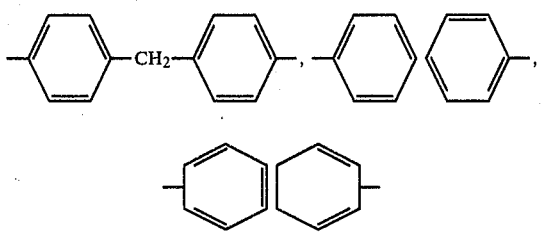

etc.), divalent hydrocarbon ether radicals free of aliphatic unsaturation (e.g. —CH$_2$CH$_2$OCH$_2$CH$_2$—, —CH$_2$CH$_2$CH$_2$—OCH$_2$CH$_2$—, etc.), and divalent haloarylene radicals (e.g., etc.).

Any one or more of the above said divalent linkages can be present in organosilicon compound (5). As with polymer (1), when the average number of silicon atoms per molecule of (5) is greater than three, it is preferred that at least 50 percent of the above divalent linkages be oxygen. This is not necessary, however, especially when organosilicon compound (5) is a cyclic material. Organosilicon compound (5) can be a homopolymer, a copolymer, a monomer or mixture of two or more of the foregoing, provided only that each is free of aliphatic unsaturation and each contain an average per molecule of at least two silicon-bonded hydrogen atoms.

Preparation of material that come within the definition of organosilicon compound (5) are well known in the art, and many examples of such materials are available commercially. Thus, reaction of method of manufacture of these materials would be redundant herein.

The selection of (1) and (5) is somewhat interrelated. When the average number of aliphatically unsaturated groups per molecule in organosilicon polymer (1) is 2.0, organosilicon compound (5) should be selected wherein the average number of silicon-bonded hydrogen atoms per molecule is at least 2.0, so that the total of the just defined quantities is at least 4. The analogous is true in that when the chosen organosilicon compound (5) contains 2.0 (average) silicon-bonded hydrogen atoms per molecule organosilicon polymer (1) should be selected wherein the average number of aliphatically unsaturated groups per molecule is at least 2.0, so that the total of the just defined quantities is at least 4. When either (1) or (5) has the defined quantity greater than 2.0, selection of the other component on this basis is irrelevant. It should be understood, of course, that the higher the sum of these quantities, the more highly crosslinked can be the composition.

The molar ratio of silicon-bonded hydrogen atoms in organosilicon compound (5) to aliphatically unsaturated radicals in organosilicon polymer (1) can in some cases be an important consideration. When the cured organosilicon composition of this invention is an elastomer, it is preferred that the ratio of these two is from 0.6/1 and 4.0/1. The most preferred ratio is between 1.5/1 and 2.0/1. However, there are many instances wherein a balance of these two quantities is unimportant. For example, if a polymer (1) has, say an average of six aliphatically unsaturated groups per molecule, the use of equal molar amounts of silicon-bonded hydrogen atoms may well give a cure too highly crosslinked for the desired end use. Thus, less than, sometimes much less than, the equal molar amount of SiH would be used to provide the desired degree of cure. However, when maximum stability is required, it is desirable to match the molar quantities of silicon-bonded hydrogen atoms in (5) to the aliphatically unsaturated radicals in (1).

The formation of the in situ platinum catalyst inhibitor by the method of this invention in a composition comprising organosilicon polymer (1), platinum catalyst (2), and organosilicon compound (5) slows down the rate of cure at room temperature to completely prevent a cure at room temperature over long periods of time such as greater than 3 months, but at temperature in excess of 70° C., the inhibiting effect observed at room temperature disappears and a normal cure rate is realized. The cure of the curable composition can be retarded at room temperature for short periods of time or for very long periods of time by the amount of *in situ* produced olefinic siloxane compound, which is determined by the amount of siloxane compound (4) that is used in the first step of this method. No exact amount of siloxane compound (4) can be suggested to give a specified storage life at room temperature until the ingredients and method of preparation are known. During the heating step (B) of the method of this invention, the siloxane compound reacts with the actylenic alcohol to produce an olefinic siloxane compound which is a platinum catalyst inhibitor, so the amount of inhibitor present in the final mixture is dependent upon the amount of siloxane compound (4) added, as well as the reaction time and temperature selected.

The amount of olefinic siloxane compound present in the final mixture should be less than 10 percent by weight, based upon the total weight. The peferred amount of in situ produced olefinic siloxane compound is 4 percent by weight or less. The least amount of olefinic siloxane compound that acts as a practical cure inhibitor is about 0.25 percent by weight.

The rate of cure at temperatures up to 60° C. will depend upon the ratio of in situ platinum catalyst inhibitor formed to platinum, the form of the platinum catalyst, the nature of the siloxane compound (4) used, the nature of the acetylenic alcohol (3) used, the nature and amounts of ingredients (1) and (5) and the presence or absence of other non-essential ingredients.

The amount of acetylenic alcohol (3) to be used is determined by the amount and kind of siloxane compound (4) that is used. The minimum amount is one mole of acetylenic alcohol per 3 moles of SiH present in the siloxane. The maximum amount is undetermined since any excess is stripped out of the mixture according to the method of this invention. As high as 50 moles of acetylenic alcohol per mole of siloxane compound has been used successfully.

The preferred amount of acetylenic alcohol is one mole of acetylenic radical for each mole of silicon-bonded hydrogen in the siloxane compound (4).

The amount of siloxane compound (4) used is related to the amount of platinum used. A storage life of greater than 2 months at room temperature was obtained when 40 moles of siloxane compound was used per mole of platinum. As high as 8000 moles of siloxane compound per mole of platinum has also been used to give a storage life of greater than 27 months.

The ratios of ingredients are determined by the desired use and the nature of the system used. The skilled worker should therefore determine the optinum level for each system to provide the combination of cure rate and storage stability desired.

The curing reaction is that of addition of an SiH of (5) to an unsaturated radial on silicon of (1). The addition of SiH to allyl on silicon serves to illustrate the reaction as follows:

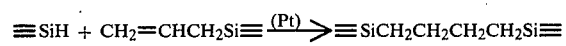

It is noteworthy that no byproducts are formed in the curing reaction. Thus, it is not necessary to cure the system under pressure as is the case when the curing system produces byproducts which are volatile. Further, it is unnecessary to carefully postbake the cured composition, as is necessary with most other heat activated curing systems now used in organosilicon compositions. It is already well known that a curing system involving SiH and aliphatically unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as fillers (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should of course be excluded, but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections, and under pressure and at atmospheric pressure with equal ease merely by the application of heat above about 70° C. There is complete freedom from the undesirable sponging associated with some curing systems when pressure is not used. When the composition is cured in the open exposed to the atmosphere, there is freedom from an uncured surface, such as sometimes found when using organic peroxides. Thus, advantages of this particular system include excellent thick-section cure, absence of air-inhibition, and therefore uniform cure throughout the sample.

The amount of organosilicon compound (5) used is dependent upon the type of organosilicon polymer used, the type of organosilicon compound used, and the degree of cure desired, all of which have been discussed above. Particularly useful organosilicon compositions have been made having from 3 parts to 6 parts by weight of organosilicon compound per 100 parts by weight of organosilicon polymer. Fillers are usually used in amounts of from 0 to 100 parts of filler per 100 parts of organosilicon polymer.

The organosilicon compositions of this invention are useful potting, encapsulating, coating, and molding materials. The cured product can form a resin or an elastomer. Resinous products are useful, for instance, for potting and encapsulting electrical apparatus, forming protective coatings, and producing molding compounds. Elastomeric products are useful, for instance, for coatings for electrical apparatus, as coating for fabrics, and as injection-molded elastomeric parts.

The following examples are presented for illustrative purposes and should not be construed as limiting this invention which is properly delineated in the claims. All parts are parts by weight.

EXAMPLE 1

A mixture was prepared consisting of 63 g of a methylphenylvinylsiloxy endblocked polydimethylsiloxane having an average ratio of organic radicals per silicon atom of about 2.014, 33 g of a ground quartz filler with an average particle size of about 5 micrometers, and sufficient platinum catalyst to give 12 parts by weight platinum per one million parts by weight of the polydimethylsiloxane. The platinum catalyst consisted of a chloroplatinic acid complex of divinyltetramethyldisiloxane diluted with methylphenylvinylsiloxy endblocked polydimethylsiloxane to provide 0.7 weight percent platinum. To this mixture was added 6 g of a siloxane compound of the formula $(CH_3)_3SiO[(CH_3)HSiO]_3Si(CH_3)_3$ and 1.5 g of the acetylenic alcohol, 3-methyl-1-butyn-3-ol. This resulting mixture was given one pass through a three roll mill to thoroughly mix, then it was sealed into a ½ pint double friction can. The can was then placed in an oven heated to 120° C. for one hour. After cooling to room temperature, the contents were vacuum stripped by exposing to a pressure of less than 2000 Pa for one hour. After the stripping step, 2 g of a trimethylsiloxy endblocked polyorganosiloxane having an average of 10 silicon atoms per molecule, with an average of three dimethylsiloxane units and five methylhydrogensiloxane units, was stirred into the mixture. This mixture cured in four minutes at 150° C. with a smooth surface. After storage for 161 days, the mixture was still flowable and cured in less than 5 minutes at 150° C. After 313 days storage, the mixture cured properly and was still flowable, although a higher viscosity than when originally mixed was observed.

This example illustrates a method of preparing a storage stable, one-part, heat curable organosilicon composition that contains an *in situ* formed olefinic siloxane compound inhibitor for the platinum catalyzed addition of SiH to aliphatic unsaturation at room temperature but which does not inhibit the reaction at elevated temperatures.

EXAMPLE 2

A mixture similar to that of Example 1 was prepared in a commercial dough mixer using the ingredients and ratios of Example 1 with the exception of 12 g of the siloxane compound and 3 g of the acetylenic alcohol were used. The polydimethylsiloxane, quartz filler, platinum catalyst, siloxane compound, and acetylenic alcohol were mixed for 5 minutes at room temperature. The mixer was then closed and steam heated with mixing for 40 minutes at a temperature of approximately 120° C. The mixer, fitted with a pressure relief valve and pressure gauge, showed no buildup of pressure during the mixing-heating step. After the heating period, cooling water was used to reduce the temperature. A vacuum was applied, 1300 Pa to 2700 Pa, for one hour with continued mixing.

To 96 parts of the above mixture was added 4.86 parts of the trimethylsiloxy endblocked polyorganosiloxane of Example 1. This organosilicon composition remained flowable after 27 months of shelf aging at room temperature yet cured in 5 minutes at 150° C. with a slightly wrinkled surface.

EXAMPLE 3

A series of mixtures were made to evaluate the effect of varying the ratio of acetylenic alcohol to siloxane compound.

The procedure of Example 2 was followed using the ingredients described in Example 1 in the following amounts to produce 3 mixes.

|  | Mix 1 | Mix 2 | Mix 3 |
|---|---|---|---|
| polydiorganosiloxane, parts | 63 | 63 | 63 |
| ground quartz filler, parts | 63 | 63 | 63 |
| platinum, parts per million | 12 | 12 | 12 |
| acetylenic alcohol, parts | 3 | 12 | 24 |
| siloxane compound | 12 | 12 | 12 |

The ratio of acetylenic alcohol in mix 1 to siloxane compound is the theoretical amount necessary to yield one mole of acetylenic alcohol for each mole of the siloxane compound. Mixes 2 and 3 are an excess of acetylenic alcohol over that theoretically required. The excess acetylenic alcohol that does not react is removed by vacuum during the mixing.

A mix "B" was prepared by mixing 100 parts of the polydiorganosiloxane and enough platinum catalyst to give 12 parts of platinum per million parts of the polydiorganosiloxane.

A mix "C" was prepared by mixing 100 parts of the polydiorganosiloxane, enough platinum catalyst to give 12 parts of platinum per million parts of the polydiorganosiloxane, and 33 parts of the ground quartz filler.

Each of the mixes 1, 2, or 3, which contained the *in situ* produced inhibitor was then mixed with the mix B or mix C to produce a series of mixes containing varying amounts of quartz filler and varying amounts of *in situ* produced inhibitor. The amounts used are shown in Table I.

Each of the above described mixes was mixed with the amount of organosilicon compound (containing silicon-bonded hydrogen atoms) of Example 1 as shown in Table I.

The organosilicon compositions were then cured at 150° C. and tested with the results shown in Table I.

The inhibitor level was calculated by assuming the reaction of theoretical amounts of siloxane compound and acetylinic alcohol, i.e., 12 g of siloxane compound and 3 g of acetylinic alcohol, then dividing the amount present by the total weight of the mixture being cured. In calculating the inhibitor level in mix 2 and mix 3, it is assumed that all excess acetylinic alcohol was removed.

As the amount of acetylenic alcohol used in producing the base is increased, the cure time of the final organosilicon composition becomes longer as does the pot life of the composition when stored at room temperature. The highest level of *in situ* produced inhibitor produced slight wrinkling on the surface of the cured material while lowering the inhibitor level by dilution produced a smooth surface.

TABLE I

| | Formulations | | | | Properties | | | |
|---|---|---|---|---|---|---|---|---|
| Mix 1 g | Mix C g | Mix B g | Organosilicon Compound g | Inhibitor Level wt. % | Pot Life** | Cure Time Min. | Surface Appearance | Durometer |
| Mix 1 | | | | | | | | |
| 100 | — | — | 3.0 | ≅ 10.6 | 4.0y | 5 | smooth | 16 |
| 50 | — | 50 | 4.5 | ≅ 5.3 | 2y3m | 5 | smooth | 16 |
| 25 | 75 | — | 4.4 | ≅ 2.65 | 1y1m | <5 | smooth | 27 |
| Mix 2 | | | | | | | | |
| 100 | — | — | 3.0 | ≅ 10.6 | 4.0y | >20 | sl. wrinkle | — |
| 50 | — | 50 | 4.5 | ≅ 5.3 | 4.0y | 7 | smooth | 21 |
| 25 | 75 | — | 4.4 | ≅ 2.65 | 1y10m | <5 | smooth | 33 |
| Mix 3 | | | | | | | | |
| 100 | — | — | 3.0 | ≅ 10.6 | 4.0y | 20* | sl. wrinkle | — |
| 50 | — | 50 | 4.5 | ≅ 5.3 | 4.0y | <10 | smooth | 20 |
| 25 | 75 | — | 4.4 | ≅ 2.65 | 2y | <5 | smooth | 32 |

Mix 1: 3 parts 3-methyl-1-butyn-3-ol
Mix 2: 12 parts 3-methyl-1-butyn-3-ol
Mix 3: 24 parts 3-methyl-1-butyn-3-ol
Mix B: 100 parts polydimethylsiloxane, 12 ppm platinum
Mix C: 100 parts polydimethylsiloxane, 12 ppm platinum, 33 parts ground quartz
*Skin cured
**y = year, m = month

EXAMPLE 4

This example illustrates a variation in the method of this invention. A portion of the organosilicon polymer is used during the formation of the in situ produced inhibitor, then the remainder of the polymer is added after the removal of excess acetylenic alcohol and cooling of the mixture. This example also illustrates the addition of filler to the mixture after the production of the *in situ* formed inhibitor.

To a one gallon dough mixer was added 237 g of the polydimethylsiloxane of Example 1, 1.38 g of the platinum catalyst, 38.8 g of 3-methyl-1-butyn-3-ol, and 19.4 g of the siloxane compound. These were thoroughly mixed, then heated to 120° C. for one hour. Mixing was continued for 30 minutes at 120° C. while applying vacuum to the mixer to remove unreacted 3-methyl-1-butyn-3-ol. The mixture was then cooled to 50° C. by running cooling water through the mixer jacket for 15 minutes. A conventional plasticizer consisting of 14.1 g of a hydroxyl endblocked polymethylphenylsiloxane fluid having about 4.5 weight percent silicon-bonded hydroxyl radical was then mixed in. About 24 g of a fume silica filler having approximately 250 m²/g surface area was added and mixed for 5 minutes. Another 23.1 g of the silica was added with 5 minutes of additional mixing. A pigment master batch consisting of 12 parts of the polydimethylsiloxane, 2 parts of zinc oxide, and 1 part of lampblack was added in an amount of 36 g, mixing for 15 minutes. An additional 237.3 g of the polydimethylsiloxane was slowly added with 5 minutes mixing time. The mixture was then cooled to room temperature by mixing for 15 minutes with cooling water running through the mixer jacket. Finally, the organosilicon compound was added consisting of 27 g of the trimethylsiloxy endblocked polyorganosiloxane of Example 1. A final mixing period of 15 minutes assured a homogeneous mixture.

The completed organosilicon composition was slightly thixotropic. Samples were cured as shown below and standard physical properties measured. The room temperature pot life of the material was greater than two months. A sample cured 5 minutes at 150° C. gave a smooth surface.

| Cure | 15 min. at 175° C. | 8 hr. at 200° C. |
|---|---|---|
| Tensile Strength, MPa | 1.04 | 1.18 |
| Elongation, % | 224 | 171 |
| Durometer, Shore A | 23 | 33 |

The same formulation, manufactured as a two part system without an olefinic siloxane cure inhibitor, had the following properties:

| Cure | 15 min. at 175° C. | 8 hr. at 200° C. |
|---|---|---|
| Tensile Strength, MPa | 1.29 | 1.34 |
| Elongation, % | 136 | 87 |
| Durometer, Shore A | 34 | 42 |

EXAMPLE 5

A series of organosilicon compositions were made varying the siloxane compound used. The remainder of the ingredients and the method were the same in each case.

To a one gallon dough mixer was added 254 g of the polydimethylsiloxane of Example 1, 255 g of the ground quartz, 1.52 g of the platinum catalyst, the amount of 3-methyl-1-butyn-3-ol shown in Table II, and the amount and kind of siloxane compound shown in Table II. The mixer contents were mixed and heated for 45 minutes using 70 psi steam in the mixer jacket to give about 120° C. internal temperature. A vacuum was then applied and mixing and heating continued for 45 minutes. The mixer contents were cooled to below 50° C. and another 254 g of the polydimethylsiloxane added and mixed in with cooling to room temperature. The mixture was removed from the mixer, weighed and 4.5 g of the trimethylsiloxy endblocked polyorganosiloxane of Example 1 was added for each 100 g of the mixture. A portion of the final mixture was heated at 150° C. to measure the time required to cure as well as observe the nature of the surface of the cured sample. The viscosity of the sample was measured with a Brookfield Viscometer. After 2.5 months, the viscosity of the mixture was again measured. The results of these tests are tabulated in Table II.

The above procedure was repeated with the exception of the use of the amount of 3-methyl-1-butyn-3-ol shown in Table II and the use of the amount and kind of siloxane compound shown in Table II.

All of the siloxane compounds tested reacted with the acetylenic alcohol to produce a heat curable organosilicon composition that possessed storage stability. There was a difference in the viscosity of the compositions depending upon the siloxane compound used.

butyn-3-ol used in (A) to produce the in situ reacted cure inhibitor. When samples for testing were desired, the mixture was mixed with 4.5 g of the trimethylsiloxy endblocked polyorganosiloxane, 0.028 g of 3-methyl-1-butyn-3-ol, and catalyzed with 0.2 g of the platinum catalyst.

Each composition was tested with the results shown in Table III. Composition A is a storage stable, one part, heat curable organosilicon product while composition B after catalyzation is not stable at room temperature.

TABLE III

| Composition | A | B |
|---|---|---|
| Pot Life | >5 months | 30 minutes |
| Cure Time, 200° C. | <2 minutes | <1 minute |
| Surface | smooth | wrinkled |
| Physical Properties after a cure of 15 min. at 175° C. | | |
| Tensile Strength, MPa | 0.87 | 1.49 |
| Elongation, % | 125 | 128 |

TABLE II

| Sample | Siloxane Type | Amount, g | Alcohol** Amount, g | Viscosity, Pa·s original | Viscosity, Pa·s aged* | Cure Time | Surface Appearance | Pot Life |
|---|---|---|---|---|---|---|---|---|
| A | $(CH_3)_3Si(OSi)_xOSi(CH_3)_3$ with $CH_3$ and $H$ substituents | 19.06 | 38.12 | 4.6 | 7.0 | 5 min. | smooth | >2 mo. |
| B | $(CH_3)_3Si(OSi)_xOSi(CH_3)_3$ with $CH_3$ and $H$ substituents | 8.53 | 19.06 | 2.7 | 3.9 | 5 min. | smooth | >2 mo. |
| C | $(CH_3)_3Si(OSi)_3OSi(CH_3)_3$ with $CH_3$ and $H$ substituents | 8.53 | 19.06 | 2.1 | 2.2 | 5 min. | smooth | >2 mo. |
| D | $(CH_3)_3Si(OSi)_yOSi(CH_3)_3$ with $CH_3$ and $H$ substituents | 8.53 | 19.06 | 5.3 | 4.4 | 5 min. | smooth | >2 mo. |
| E | $(CH_3)_3Si(OSi)_yOSi(CH_3)_3$ with $CH_3$ and $H$ substituents | 4.76 | 8.53 | .7 | 5.9 | 5 min. | sl. wrinkle | >2 mo. |
| F | $[(CH_3)HSiO]_5$ | 8.53 | 19.06 | 13.8 | 10.4 | 10 min. | pocky | >2 mo. |
| G | $[(CH_3)HSiO]_5$ | 4.76 | 8.53 | 5.2 | 3.3 | 5 min. | pocky | >2 mo. |

$x$ = equal or greater than 3
$y$ = approximately 35
\* = 2.5 months at room temperatures
\*\* = 3-methyl-1-butyn-3-ol

EXAMPLE 6

A comparison was made of an organosilicon composition of this invention and the identical composition made as a conventional two part system which does not include the in situ produced inhibitor.

(A) A one gallon dough mixer was loaded with 254 g of the polydimethylsiloxane of Example 1, 255 g of the ground quartz, 1.52 g of the platinum catalyst, 6 g of the siloxane compound, 38.12 g of the 3-methyl-1-butyn-3-ol and 2.56 g of lampblack. The contents were then mixed for 45 minutes while the mixer was heated with steam at 70 psi. A vacuum was then applied while hot and mixing continued for 45 minutes. Another 254 g of the polydimethylsiloxane was mixed in, then the contents were cooled to room temperature. The trimethylsiloxy endblocked polyorganosiloxane of Example 1 was then added at a rate of 4.5 g per 100 g of the cooled mixture.

(B) A similar run was made, leaving out the platinum catalyst, siloxane compound, and 3-methyl-1-

| | | |
|---|---|---|
| Durometer | 29 | 35 |
| Physical Properties after a cure of 70 hrs. at 200° C. | | |
| Tensile Strength, MPa | 1.55 | 1.65 |
| Elongation, % | 170 | 170 |
| Durometer | 48 | 47 |

That which is claimed is:

1. A method of preparing a storage stable, one part, heat curable organosilicon composition consisting essentially of (A) mixing (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of said organosilicon polymer being satisfied by divalent radicals selected from the group consisting of divalent oxygen atoms, divalent hydrocarbon radicals, divalent hydrocarbon ether radicals, and divalent haloarylene radicals, said divalent radicals linking silicon atoms; (2) a platinum catalyst in an amount of at least 0.1 part by weight of platinum per one million parts by weight of the combined weights of organosilicon polymer (1) and organosilicon compound (5); (3) an acetylenic alcohol, liquid at the reaction conditions of step (B) and distillable at temperatures of less than 120° C. at a pressure of 133 pascal, in an amount sufficient to provide at least one mole of acetylenic radical for each 3 moles of silicon-bond hydrogen atoms in siloxane compound (4); (4) a siloxane compound having at least 3 silicon-bonded hydrogen atoms with no more than one silicon-bonded hydrogen atom per silicon atom, the organic groups on the silicon atoms being monovalent hydrocarbon radicals having no aliphatic unsaturation, the siloxane compound being a linear, branched, or cyclic molecule containing from 3 to 100 siloxane units, then (B) heating to a temperature which is between 100° and 150° C. and which is also above the temperature at which an olefinic siloxane compound formed by the reaction of the acetylenic alcohol (3) and the siloxane compound (4) is no longer an inhibitor for the reaction in a closed container for a time sufficient to allow the reaction to produce the olefinic siloxane compound, (C) cooling to below 50° C., (D) reducing pressure over the reaction mixture to an amount sufficient to remove any unreacted acetylenic alcohol (3), then (E) admixing (5) an organosilicon compound containing silicon-bonded hydrogen atoms, there being in addition an average of up to 2 monovalent organic radicals per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals, and divalent haloarylene radicals, said divalent radicals linking silicon atoms, there being an average of at least two silicon-bonded hydrogen atoms per molecule of organosilicon compound (5), the sum of the average number of aliphatic unsaturated monovalent radicals per molecule of organosilicon polymer (1) and the average number of silicon-bonded hydrogen atoms per molecule of organosilicon compound (5) being at least 4, the organosilicon composition further restricted in that the amount of organosilicon polymer (1) is sufficient to control the reaction exotherm.

2. The method of claim 1 in which the total amount of acetylenic alcohol (3) and siloxane compound (4) is less than 50 percent by weight of the total weight of the reaction mixture (A).

3. The method in accordance with claim 2 in which the platinum catalyst is present in an amount of from 0.1 to 50 parts by weight of platinum per one million parts by weight of the combined weights of organosilicon polymer (1) and organosilicon compound (5); the acetylenic alcohol (3) has one acetylenic radical per molecule; the siloxane compound (4) contains from 3 to 50 siloxane units per molecule with at least 2 of the silicon-bonded hydrogen atoms attached to silicon atoms separated only by one oxygen atom; and the ratio of silicon-bonded hydrogen atoms in organosilicon compound (5) to monovalent hydrocarbon radicals containing aliphatic unsaturation in organosilicon polymer (1) is from 0.6/1 to 4.0/1.

4. The method in accordance with claim 3 in which the organosilicon polymer (1) is a triorganosiloxy endblocked polydiorganosiloxane having a viscosity of at least 0.1 pascal-second at 25° C., and the organic radicals are methyl, phenyl, and vinyl; the acetylenic alcohol is 3-methyl-1-butyn-3-ol; the siloxane compound (4) is an organosiloxane having two $(CH_3)_3SiO_{0.5}$ units and three $(CH_3)HSiO$ units; and the ratio of silicon-bonded hydrogen atoms in organosilicon compound (5) to monovalent hydrocarbon radicals containing aliphatic unsaturation in organosilicon polymer (1) is from 1.5/1 to 2.0/1.

5. A method of preparing a storage stable, one part, heat curable organosilicon composition consisting essentially of (A) mixing (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of said organosilicon polymer being satisfied by divalent radicals selected from the group consisting of divalent oxygen atoms, divalent hydrocarbon radicals, divalent hydrocarbon ether radicals, and divalent haloarylene radicals, said divalent radicals linking silicon atoms; (2) a platinum catalyst in an amount of at least 0.1 parts by weight of platinum per one million parts by weight of the combined weights of organosilicon polymer (1) and organosilicon compound (5); (3) an acetylenic alcohol, liquid at the reaction conditions of step (B) and distillable at temperatures of less than 120° C. at a pressure of 133 pascal, in an amount sufficient to provide at least one mole of acetylenic radical for each 3 moles of silicon-bond hydrogen atoms in siloxane compound (4); (4) a siloxane having at least 3 silicon-bonded hydrogen atoms with no more than one silicon-bonded hydrogen atom per silicon atom, the organic groups on the silicon atoms being monovalent hydrocarbon radicals having no aliphatic unsaturation, the siloxane compound being a linear, branched, or cyclic molecule containing from 3 to 100 siloxane units, then (B) heating to a temperature which is between 100° and 150° C. and which is also above the temperature at which an olefinic siloxane compound formed by the reaction of the acetylenic alcohol (3) and the siloxane compound (4) is no longer an inhibitor for the reaction in a closed container for a time sufficient to allow the reaction to produce the olefinic siloxane compound, (D) reducing pressure over the reaction mixture in the mixer to an amount sufficient to remove any unreacted acetylenic alcohol (3), then (C) cooling to below 50° C., then (E) admixing (5) an organosilicon compound containing silicon-bonded hydrogen atoms, there being in addition an average of up to 2 monovalent organic radicals per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals, and divalent haloarylene radicals, said divalent radicals linking silicon atoms, there being an average of at least two silicon-bonded hydrogen atoms per molecule of organosilicon compound (5), the sum of the average number of aliphatic unsaturated monovalent radicals per molecule of organosilicon polymer (1) and the average number of silicon-bonded hydrogen atoms per molecule of organosilicon compound (5) being at least 4, the organosilicon composition further restricted in that the amount of organosilicon polymer (1) is sufficient to control the reaction exotherm.

6. The method of claim 5 in which the total amount of acetylenic alcohol (3) and siloxane compound (4) is less than 50 percent by weight of the total weight of the reaction mixture (A).

7. The method of claim 6 in which the platinum catalyst is present in an amount of from 0.1 to 50 parts by weight of platinum per one million parts by weight of the combined weights of organosilicon polymer (1) and organosilicon compound (5); the acetylenic alcohol (3) has one acetylenic radical per molecule; the siloxane compound (4) contains from 3 to 50 siloxane units per molecule with at least 2 of the silicon-bonded hydrogen atoms attached to silicon atoms separated only by one oxygen atom; and the ratio of silicon-bonded hydrogen atoms in organosilicon compound (5) to monovalent hydrocarbon radicals containing aliphatic unsaturation in oganosilicon polymer (1) is from 0.6/1 to 4.0/1.

8. The method in accordance with claim 7 in which the organosilicon polymer (1) is a triorganosiloxy endblocked polydiorganosiloxane having a viscosity of at least 0.1 pascal·second at 25° C., and the organic radicals are methyl, phenyl, and vinyl; the acetylenic alcohol is 3-methyl-1-butyn-3-ol; the siloxane compound (4) is an organosiloxane having two $(CH_3)_3SiO_{0.5}$ units and three $(CH_3HSiO$ units; and the ratio of silicon-bonded hydrogen atoms in organosilicon compound (5) to monovalent hydrocarbon radicals containing aliphatic unsaturation in organosilicon polymer (1) is from 1.5/1 to 2.0/1.

9. The method of claim 1, 2, 3, or 4 in which a portion of the organosilicon polymer (1) is added in step (A) and the remainder is added at any point in the method following step (D).

10. The method of claim 5, 6, 7, or 8 in which a portion of the organosilicon polymer (1) is added in step (A) and the remainder is added at any point in the method following step (C).

11. The method of claim 1, 2, 3, 4, 5, 6, 7, or 8 in which a filler is included in the ingredients used in step (A).

12. The composition produced by the method of claim 1, 2, 3, 4, 5, 6, 7, or 8.

13. The composition produced by the method of claim 1 in which a filler is included in the ingredients used in step (A).

14. The composition produced by the method of claim 2 in which a filler is included in the ingredients used in step (A).

15. The composition produced by the method of claim 3 in which a filler is included in the ingredients used in step (A).

16. The composition produced by the method of claim 4 in which a filler is included in the ingredients used in step (A).

* * * * *

UNITED STATES PATENT AND TRADEMARK OFFICE
CERTIFICATE OF CORRECTION

PATENT NO. : 4,336,364
DATED : June 22, 1982
INVENTOR(S) : Myron T. Maxson

It is certified that error appears in the above—identified patent and that said Letters Patent is hereby corrected as shown below:

Column 10, line 44 - the word "material" should read "materials"

Column 10, line 47 - the phrase "reaction of method" should read "recitation of methods"

Column 11, line 37 - the word "actylenic" should read "acetylenic"

Column 11, line 45 - the word "peferred" should read "preferred"

Column 12, line 14 - the word "radial" should read "radical"

UNITED STATES PATENT AND TRADEMARK OFFICE
CERTIFICATE OF CORRECTION

PATENT NO. : 4,336,364

DATED : June 22, 1982

INVENTOR(S) : Myron T. Maxson

It is certified that error appears in the above—identified patent and that said Letters Patent is hereby corrected as shown below:

Column 20, line 37 - the word "parts" should read "part"

Column 22, line 10 - the formula "$(CH_3HSiO$" should read "$(CH_3)HSiO$"

Signed and Sealed this

Twenty-third Day of November 1982

[SEAL]

Attest:

GERALD J. MOSSINGHOFF

Attesting Officer

Commissioner of Patents and Trademarks